July 29, 1930.  J. H. OSBORN ET AL  1,771,814
COMBINED HUMIDIFIER AND AIR WASHER
Filed Dec. 26, 1928
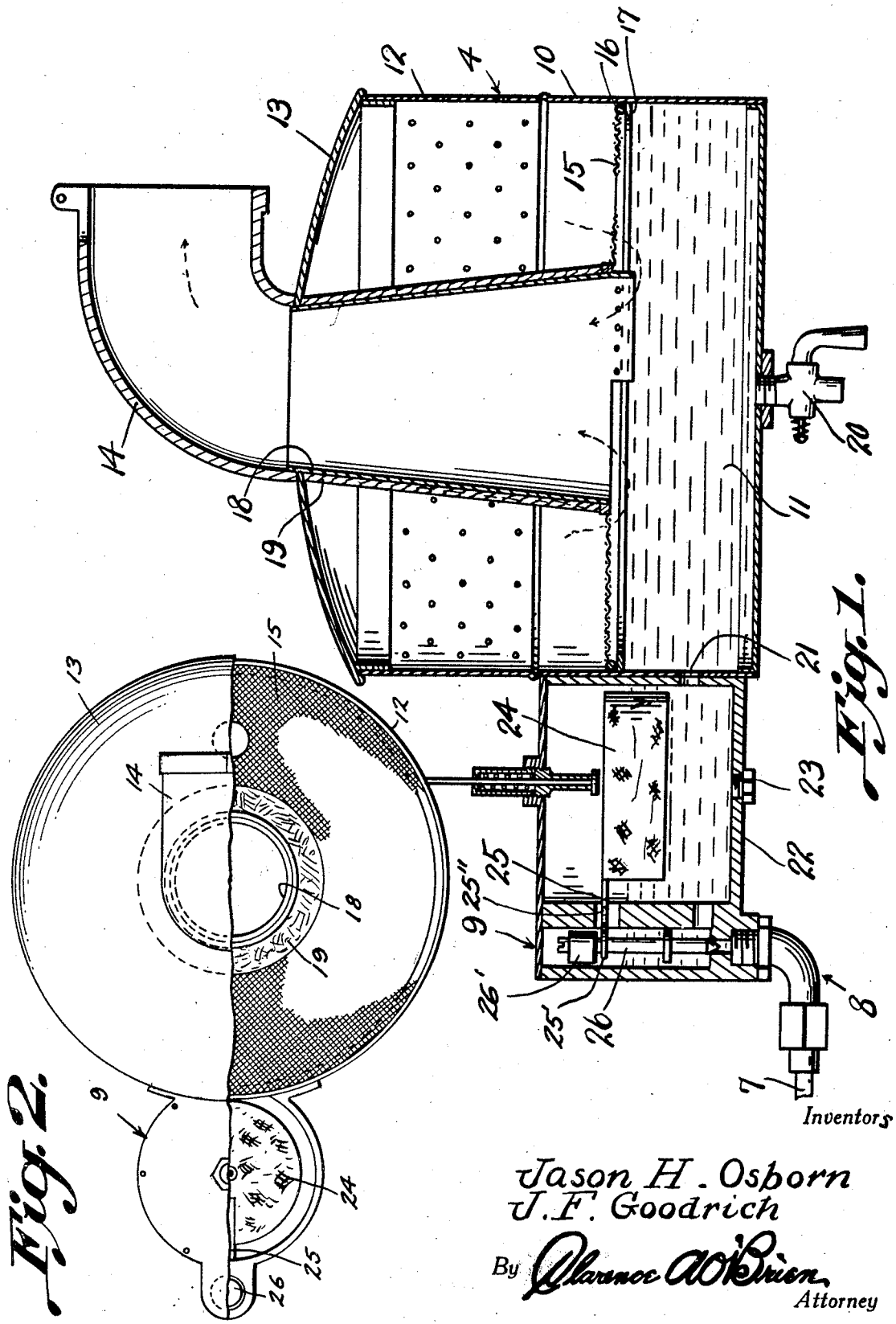
Inventors
Jason H. Osborn
J. F. Goodrich
By Clarence A. O'Brien
Attorney Patented July 29, 1930

1,771,814

UNITED STATES PATENT OFFICE

JASON H. OSBORN AND JOHN F. GOODRICH, OF HAYDEN JUNCTION, ARIZONA

COMBINED HUMIDIFIER AND AIR WASHER

Application filed December 26, 1928. Serial No. 328,601.

This invention relates to the broad class of internal combustion engines and more specifically to automotive appliances, and it has reference to a novel contribution to this art which has the double function of an air moistener or humidifier, and an air washer or cleaner.

Briefly described, the invention comprises an appropriate valved water container constructed to be mounted on the motor, and made to convey filtered and moistened air to the carburetor.

In carrying the invention into effect, we have produced a novel structural arrangement of parts intimately cooperating in making a complete device of an economical and practicable type which will first cleanse the incoming dust laden air, carry it into a body of water to free it of dust and extraneous matter, and then conduct it to the carburetor in a moistened state for efficient utilization.

The principal object is to generally improve upon inventions of this class by providing one which is characterized by a compact and convenient arrangement of elements so associated as to insure efficient performance in a positive and dependable manner, and to better fulfill the requirements of an invention of this species.

Other objects and advantages will become more readily apparent from the following description and drawings.

In the drawings:

Figure 1 is an enlarged vertical or longitudinal section through the principal part of the device.

Figure 2 is a fragmentary plan view in section and elevation.

Generally described, the reference numeral 4 designates a novel filtering unit, and 7 indicates the water supply pipe. This pipe is connected through the medium of a fitting 8 with a float chamber 9, in which there is a float 24, that controls the supply of water to the filter 4.

As shown better in Figure 2 this improved filtering device comprises a somewhat cylindrical casing whose lower portion 10 is imperforate to provide a container for a limited quantity of water 11. The upper portion, however, as indicated at 12 is provided with a multiplicity of atmospheric air intake ports or orifices. The casing is equipped with a removable cover 13 carrying an elbow connection 14 which is connected with the air intake of the carbureter (not shown). Suitably supported within the container in a plane with the normal water level is a screen 15 whose rim portion 16 rests upon a suitable annular ledge 17. Rising from the center of this is an upwardly tapered moistened air discharge tube 18 which telescopes into the elbow 14. This tube is preferably wrapped with a felt sleeve 19. The bottom of the casing is provided with a drain valve 20. The water is supplied into this container through small intake ports 21.

The float chamber 9 is attached to the lower portion of the casing in registry with this opening 21. The float device comprises a casing or container 22 having a drain plug 23 and an internal float 24. This float has operating connection as by a rod 25 with a needle valve 26 through the medium of an eye 25', which slidably encircles said valve and is engageable with the flange 26', to lift same when the float swings downwardly on the pivot pin 25'' which is mounted in the walls of the openings, through which rods 25 extend, which controls the flow of water through the elbow fitting 8. Incidentally the pipe 7 which is connected with this fitting is intended to be connected with the water cooling system. Thus the system is utilized for automatically supplying the invention with water.

In practice it is obvious that the atmospheric air is sucked into the casing 4 through the multiplicity of ports in the portion 12. It is then drawn downwardly into contact with the water. The suction, together with the existing affinity of the water for the air, causes the air to permeate the water. Thus it bubbles up through the water and is cleansed or washed. It then passes upwardly through the tube 18 into the elbow 14 and then down through the conduit 5 where it is drawn into the carburetor. Thus, the air is moistened and filtered and is therefore properly conditioned before it enters the carburetor. The result is that there is a noticeable reduction in the fuel consumption, and the motor runs more efficiently. Since, however, the general principle is well known, it is believed that persons skilled in the art to which the invention relates will be able to obtain a clear understanding of the construction, operation and advantages upon considering the description in connection with the drawings. Therefore, a more lengthy description is deemed unnecessary.

Minor changes in shape, size, and rearrangement of details coming within the field of invention claimed may be resorted to in actual practice if desired.

Having thus described the invention, what we claim as new and desire to secure by Letters Patent is:—

1. An automotive air filtering and moistening device comprising a substantially cylindrical casing having an imperforate lower portion adapted to contain a predetermined quantity of water, the upper part of the wall of said casing being provided with a multiplicity of air intake ports, a supporting ledge in the casing disposed on a plane with a normal water level, a screen in the casing supported on said ledge, a tube rising from the central portion of the screen, a cover for said casing including an elbow, said tube extending telescopically into said elbow.

2. An automotive air filtering and moistening device comprising a substantially cylindrical casing having an imperforate lower portion adapted to contain a predetermined quantity of water, the upper part of the wall of said casing being provided with a multiplicity of air intake ports, a supporting ledge in the casing disposed on a plane with a normal water level, a screen in the casing supported on said ledge, a tube rising from the central portion of the screen, a cover for said casing including an elbow, said tube extending telescopically into said elbow, a drain valve in the bottom of said casing, an intake port in the wall of the casing, and a float regulated water supply device connected with the casing and in registry with said intake port.

In testimony whereof we affix our signatures.

JASON H. OSBORN.
JOHN F. GOODRICH.